United States Patent [19]
Schroeder

[11] 4,407,433
[45] Oct. 4, 1983

[54] CONVEYOR WITH TELESCOPIC FEED TUBE

[75] Inventor: James D. Schroeder, Anoka, Minn.

[73] Assignee: Accu-Feed Corp., Anoka, Minn.

[21] Appl. No.: 164,893

[22] Filed: Jul. 1, 1980

[51] Int. Cl.³ .............................................. B67D 5/14
[52] U.S. Cl. .................................... 222/63; 222/328; 222/415; 222/286
[58] Field of Search ................. 193/30; 198/505, 525, 198/535, 540, 547, 562; 222/52, 55, 63, 77, 328, 415, 286, 56

[56] References Cited

U.S. PATENT DOCUMENTS

| | | | |
|---|---|---|---|
| 1,456,353 | 5/1923 | Bare | 222/286 X |
| 1,840,455 | 1/1932 | Lea | 222/55 X |
| 2,637,434 | 5/1953 | Harper | 222/56 X |
| 3,128,014 | 4/1964 | Turner | 222/504 X |

*Primary Examiner*—David A. Scherbel
*Attorney, Agent, or Firm*—Burd, Bartz & Gutenkauf

[57] ABSTRACT

An apparatus for the precise dispensing of particulate matter either at a uniform flow rate or in repetitious accurately measured discrete batches. The apparatus includes a housing having a hopper with a hopper outlet orientated over an endless conveyor belt. A metering tube is connected to the hopper outlet and is movable toward and away from the upper surface of the forward run of the conveyor belt. The distance of the lower end of the metering tube from the conveyor belt provides one measure of regulation of flow rate of the particulate matter from the hopper to the conveyor belt. The speed of the conveyor belt provides a second measure of regulation of the rate of flow from the hopper to the conveyor belt and eventually to a dispensing station.

18 Claims, 7 Drawing Figures

U.S. Patent  Oct. 4, 1983  Sheet 1 of 3  4,407,433
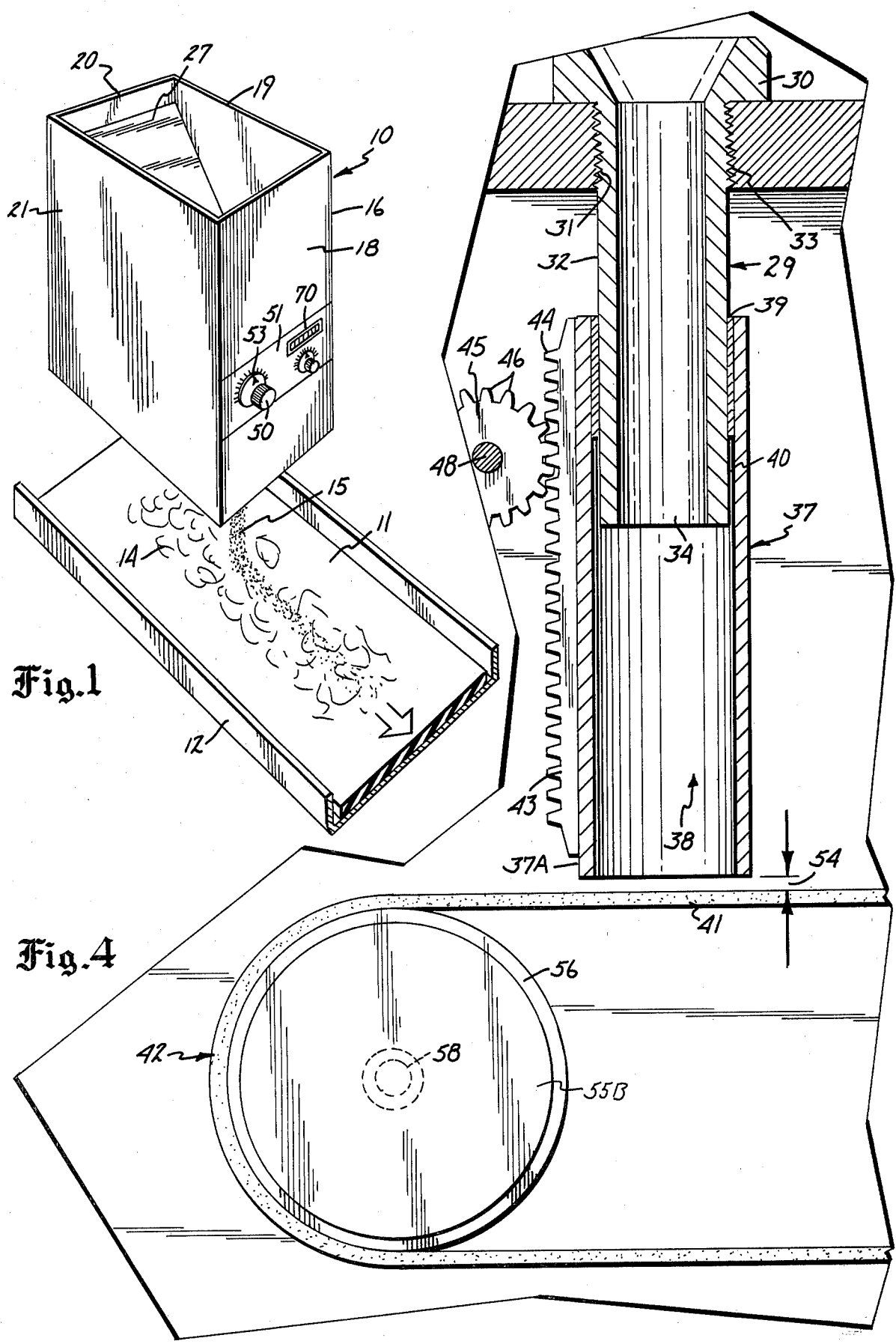

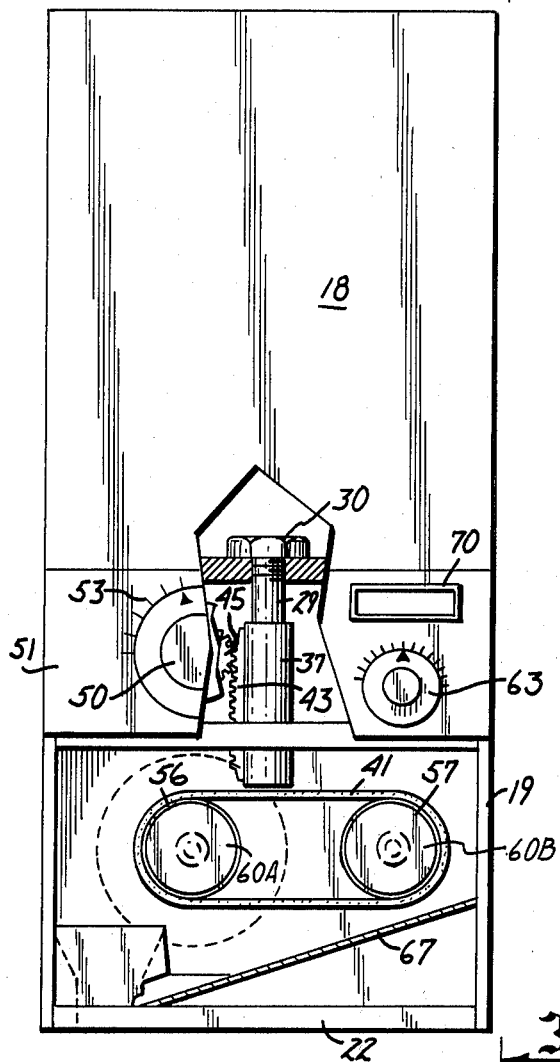
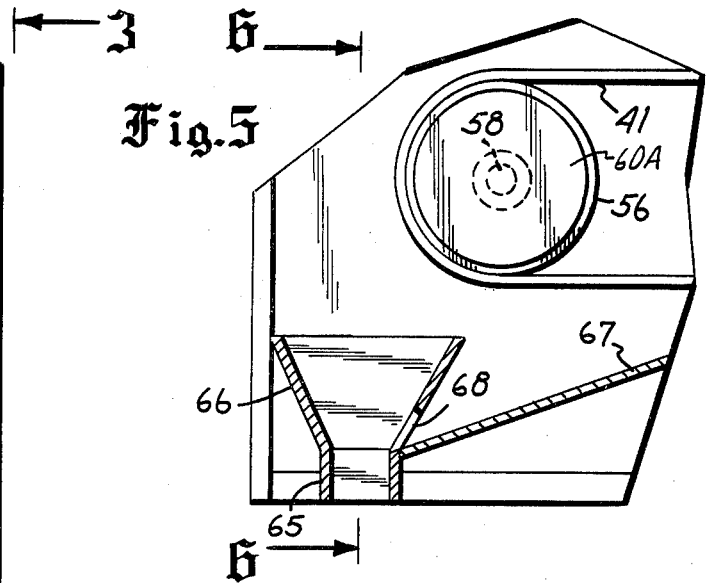
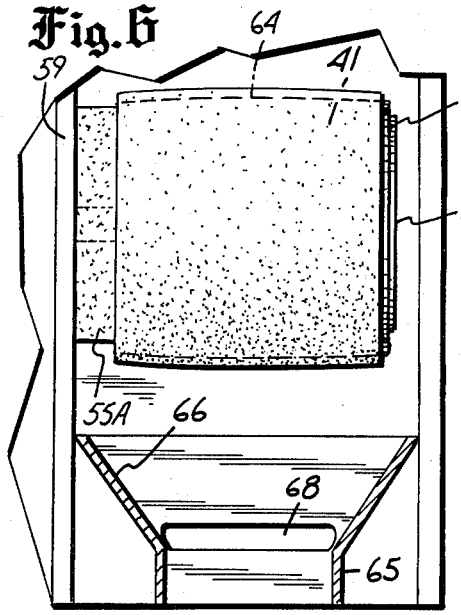
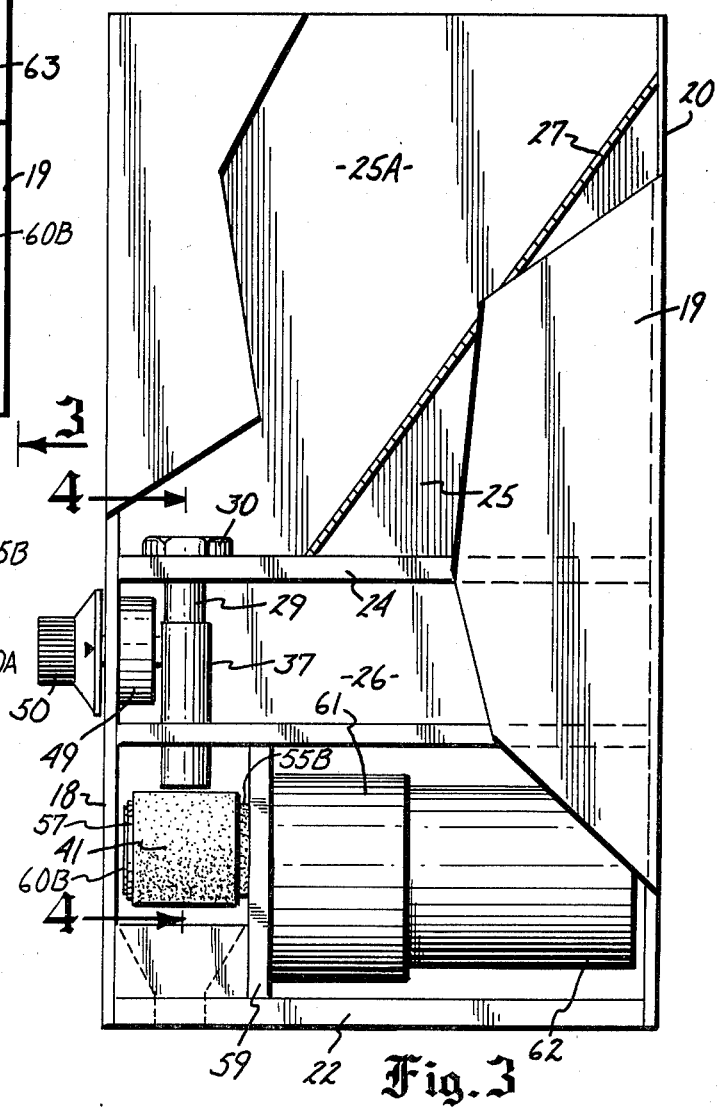

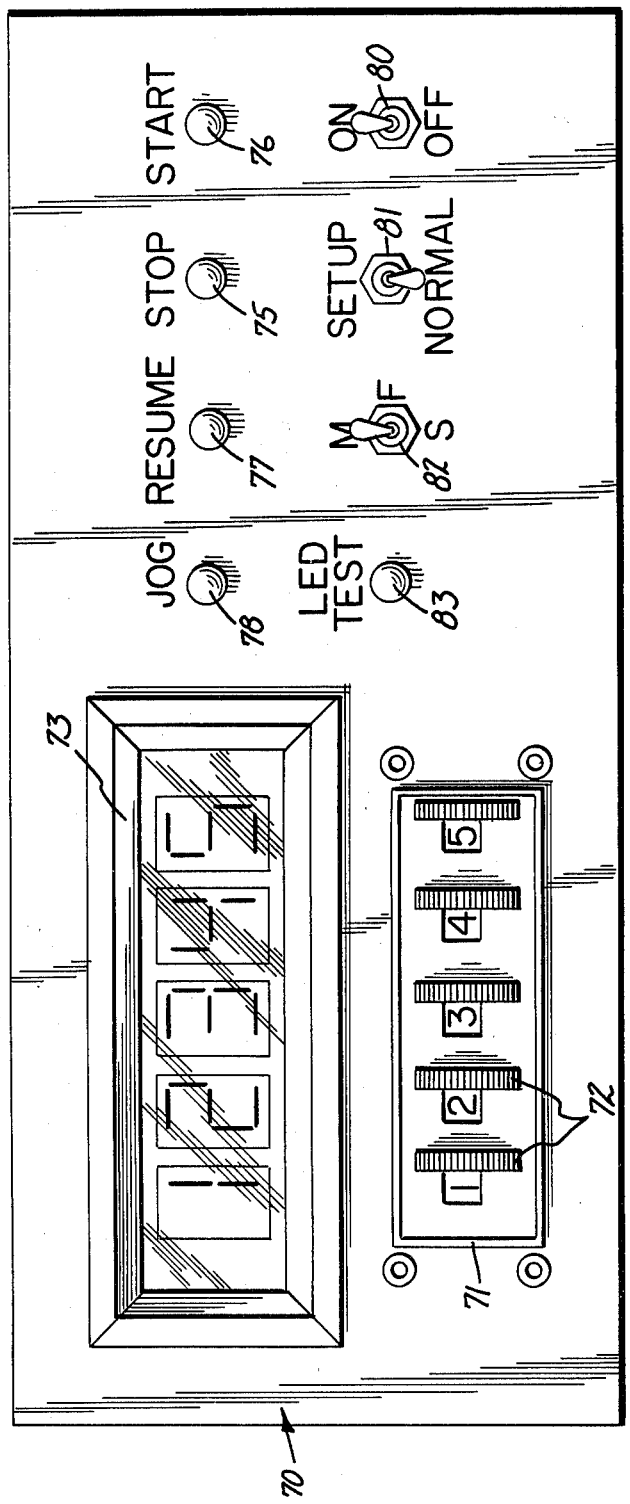

CONVEYOR WITH TELESCOPIC FEED TUBE

BACKGROUND OF THE INVENTION

The invention relates to an apparatus for the precise dispensing of particulate material either at a uniform flow rate or in repetitive accurately measured discrete quantities or batches. Such apparatus finds application where it is necessary to provide accurately measured particulate material for subsequent mixing, treatment, packaging, or the like. The apparatus includes the housing having a hopper in the upper portion thereof for storage of the particulate material. A discharge from the hopper includes a fixed orifice transfer tube extended through the floor of the hopper. An endless conveyor belt is provided to carry particulate material discharged from the hopper to a dispensing location. A metering tube is telescopically engaged at its upper end with the lower portion of the discharge spout of the transfer tube. The lower end of the metering tube is in close proximity to the upper forward run of the conveyor belt. The elevation of the lower end of the metering tube above the forward run of the conveyor belt is adjustable. The spacing between the lower end of the metering tube and the upper surface of the forward run of the conveyor belt is a first determinative factor of the amount or rate of particulate material discharged from the hopper. The speed of the conveyor belt is precisely regulated by an electric motor. The speed of the conveyor belt as the forward run moves under the lower end of the transfer tube is a second determinative factor of the amount or rate of particulate material discharged from the hopper. The conveyor belt delivers particulate material deposited upon it to an outlet discharge tube.

The apparatus can provide a uniform flow of particulate material for mixing, treatment or packaging or the like. Alternatively, the apparatus can provide a series of repetitive, accurately measured discrete quantities or batches of material. This is accomplished by precise control of the duration of operation of the electric motor to run the conveyor belt. In a set-up mode, a sample run is made where a desired amount of particulate material is discharged from the hopper and delivered to the dispensing location. The electric impulses directed to the electric motor during the set-up mode run are carefully measured and this information is set into a comparator. Thereafter, a control unit operates the electric motor to duplicate performance during the set-up mode whereby during each successive run there is delivered the same amount of particulate matter as during the set-up mode.

IN THE DRAWINGS

FIG. 1 is a perspective view of a dispensing apparatus according to the invention operatively installed with respect to an animal feed conveyor;

FIG. 2 is an enlarged side elevational view of the dispensing apparatus of FIG. 1 partially fragmented for purposes of illustration;

FIG. 3 is another side elevational view of the dispensing apparatus of FIG. 2 taken along the line 3—3 thereof and partially fragmented for purposes of illustration;

FIG. 4 is an enlarged sectional view of a portion of the dispensing apparatus shown in FIG. 3 taken along the line 4—4 thereof;

FIG. 5 is an enlarged view of a portion of the dispenser assembly in FIG. 2 showing the conveyor belt in proximity to the discharge chute;

FIG. 6 is an enlarged view of a portion of the dispenser apparatus as shown in FIG. 5 taken along line 6—6 thereof; and FIG. 7 is a schematic view of a control unit for the dispensing apparatus of the invention.

DESCRIPTION OF A PREFERRED EMBODIMENT

Referring to the drawings, there is shown in FIG. 1 a dispensing apparatus of the invention indicated generally at 10 positioned in operative relationship to the upper forward run of a feed conveyor belt 11 traveling in a track or trough 12 carrying feed 14 for eventual distribution to feeding animals such as livestock. Dispensing apparatus 10 can be used to dispense accurate amounts of vitamin supplement, trace minerals or the like into the animal feed to enhance the health and well being of the animal. Dispensing apparatus 10 dispenses particulate material to the feed at a uniform, accurately metered rate, or in discrete, individually measured repetitive doses or batches.

Dispensing apparatus 10 inludes a rectangular upright housing 16 having perpendicularly orientated side walls 18, 19, 20, 21 all fixed to a horizontal bottom wall 22. An intermediate horizontal wall 24 in housing 16 divides it into upper chamber 25 and lower chamber 26. An inclined hopper wall 27 extends from proximate the upper edge of one of the side walls 20 of housing 16 spanning between adjacent side walls 19, 21. Hopper wall 27 extends at an inclination downward with its lower edge in contact with the intermediate horizontal wall 24 forming a hopper 25A in the upper chamber 25 of housing 16 for holding particulate matter to be dispensed through apparatus 10.

An interchangeable fixed orifice transfer tube 29 extends through an opening 31 in the intermediate wall 24 from hopper 25A to the lower chamber 26 of housing 16 for transfer of particulate material from the hopper to the lower chamber. Transfer tube 29 has a head 30 abutting against the adjacent edges of the intermediate wall 24 surrounding the opening 31. A snout or shank 32 of transfer tube 29 extends through opening 31. The upper end of shank 32 adjacent the head 30 is threaded as at 33 so as to be engaged in corresponding threads located in the hole 31 extended through intermediate wall 24. The opposite end of shank 32 is extended downwardly into the lower chamber 26 of housing 16. A passage 34 is extended through the shank 32 and head 30 of transfer tube 29, having a funnel-shaped opening at the head 30 for admittance of particulate material. Transfer tube 29 is readily removable from the opening 31 and replaceable by another transfer tube having a larger or smaller diameter passage than that of the passage 34 to give a measure of control over the flow rate of particulate material from the hopper into the lower chamber.

The upper end of a metering tube 37 is in telescopic engagement with the downwardly extended portion of shank 32 of transfer tube 29. Metering tube 37 has an axial passage 38 in alignment with the axial passage 34 of the transfer tube 29. A collar 39 disposed on the interior surfaces of metering tube 37 at the upper end thereof and is in sliding engagement with the downwardly extended portion of shank 32 of transfer tube 29. Collar 39 can be made of a low friction material such as Teflon or the like in order to slide easily on the outer surface of shank 32 of transfer tube 29. The outer surface of the lower end of shank 32 is spaced from the interior surface of metering tube 37 by a distance or annular gap indicated at 40 in FIG. 4 which is approximately equal to the thickness of collar 39. The gap 40 imparts an anti-jamming quality to the operation of metering tube 37. During height adjustment and operation, gravity keeps particulate material out of gap 40 which might otherwise interfere. The lower end of metering tube 37 is poised over a forward end of the forward run of an endless conveyor belt 41 of a conveyor belt assembly 42 mounted in the lower chamber 26 of housing 16. The height of the extreme lower end 37A of metering tube 37 above the upper surface of conveyor belt 41 is adjustable in order to regulate the flow rate of particulate material from the hopper 25A to the conveyor belt 41. A linear rack 43 is fastened to the side of metering tube 37 and has a plurality of horizontally aligned teeth 44 (FIGS. 2, 3, and 4). A pinion gear 45 has teeth 46 circularly arranged and in meshing engagement with the teeth 44 on rack 43. Pinion gear 45 is mounted for rotation on a shaft 48. The intermediate portion of shaft 48 extends through a bearing block and planitary gear reduction unit 49 which is fastened to the interior surface of one of the side walls 18. Shaft 48 extends from bearing block and gear reduction unit 49 through the side wall 18 and is connected at its outer end to a control knob 50. Control knob 50 is mounted proximate a control panel 51 disposed on the outer surface of the side wall 18. Panel 51 has a circular calibrated scale 53 surrounding control knob 50. Rotation of the control knob 50 is effective to rotate the pinion gear 45 through the gear reduction unit 49 and shaft 48. As the pinion gear 45 is rotated, as can be seen from FIG. 4, the rack 43 is moved upwardly or downwardly depending on the direction of rotation. Upward and downward movement of rack 43 results in upward and downward movement of the extreme lower tip 37A of metering tube 37 with respect to the conveyor belt 41. This adjusts the space between the end of metering tube 37 and conveyor belt 41 as indicated by the opposing arrows 54 in FIG. 4. Adjustment of the dimension of the space 54 imparts one measure of control to the flow rate of particulate matter traveling from the hopper 25A to the conveyor belt 41.

Conveyor belt 41 of conveyor assembly 42 is mounted on a drive pulley 56 and an idler pulley 57. The drive pulley and idler pulley are is crowned as indicated at 64 in FIG. 6 to retain belt 41 on the pulleys. Drive pulley 56 is mounted on an axie or shaft 58 extended between one of the housing side walls 18 and an intermediate upright wall 59. A gear reduction unit 61 is fixed to the opposite side of the upright wall 59. The shaft 58 extends into the gear reduction unit 61 which is in turn connected to an electric motor 62. Foam rubber washers 55A, 55B are mounted on the sides of pulleys 56, 57 respectively between each pulley and intermediate wall 59. Washers 55A, 55B keep particulate matter out of the pulley bearings. As shown in FIG. 6, an adhesive backed tape 60A is fixed to the opposite side of drive pulley 56 to inhibit entry of particulate matter. A similar tape is fixed to the idler pulley as shown at 60B. Electric motor 62 is of variable speed which is precisely controlled by control knob 63 mounted on the control panel 51 thus to precisely vary the speed of conveyor belt 41 moving under the extreme lower end 37A of metering tube 37. Control of the speed of the conveyor belt 41 imparts a second measure of control of the rate of flow of particulate material from the hopper 25A.

A discharge tube 65 is positioned beneath the conveyor belt 41 at the end of the forward run thereof to receive particulate matter that falls off of the conveyor belt. Discharge tube 65 extends through the bottom wall 22 of housing 16. Discharge tube 65 has a flared upper opening 66 for receipt of particulate material from the conveyor belt. A collector plate or recovery tray 67 is disposed at an inclination beneath conveyor belt 41 to catch particulate material that may drop off the edges of conveyor belt 41 or that may cling to the conveyor belt as it travels over the drive pulley 56. Tray 67 is inclined downwardly from a side wall 19 of housing 16 toward the discharge tube 65. The lower edge of tray 67 is positioned adjacent the discharge tube 65. Discharge tube 65 has an opening 68 situated adjacent the lower edge of the tray 67 so that particulate matter which lands on the tray 67 will be urged downwardly by gravity along the top surface of the tray 67 and into the opening 68 of discharge tube 65 to pass through the discharge tube 65. Discharge tube 65 leads to a suitable and desired depository for the particulate matter, for example, a feed conveyor belt as shown in FIG. 1.

Dispensing apparatus 10 is functional not only to deliver a carefully measured rate of flow of particulate material, but also to deliver accurately measured individual doses or batches of particulate material. Motor 62 is connected to a control unit indicated at 70 in FIG. 7. Motor 62 can be a stepper motor or a brushless direct current motor which requires an input of properly sequenced current pulses to produce armature rotation. For example, stepper motor 62 can be a 1.8 degree per step type that requires 200 input current impulses to turn the armature one revolution. Control unit 70 includes a programmable digital counter 71 having digital displays adjustable by thumb wheels 72; a pulse generator (not shown); a programmable comparator (not shown); and a five-digit light emitting diode display (LED) 73. Control unit 70 also includes electric motor stop and start buttons 75, 76 and resume and jog controls actuated by respective buttons 77, 78. Other controls contained by control unit 70 include an on-off power switch 80, a set-up and normal switch 81, a rate switch 82 for preselected speeds of the conveyor belt depending on the density of the particulate matter to be dispensed, and an LED display test button 83.

In use of the dispensing apparatus 10 to dispense a plurality of discrete doses or batches of particulate material, a measurement device such as a scale is attached to the discharge of the dispensing apparatus. The set-up switch 81 is switched to the set-up mode, and the rate switch 82 is positioned according to how fast the conveyor belt will rotate which is determined by the composition of the particulate matter being metered. When control unit 70 is in the set-up mode, the thumb wheel switches 72 are electronically disconnected from the remainder of the unit and can be set in any position. The start button 76 is depressed and the control unit produces current pulses to run the stepper motor 62. The control unit monitors the current pulses fed to the stepper unit and displays them on the LED display. While this is occuring, particulate matter is being discharged through the discharge tube 65 and on to the scale. The stop button 75 is depressed when the desired amount of metered particulate material is approached as indicated by the scale. By pressing the jog button 78 momentarily, extra pulses are fed to the motor to briefly rotate the conveyor belt until the exact desired amount of metered particulate is delivered as indicated by the scale. The thumb wheel switches 72 are then set to match the number of pulses which have been fed to the DC motor 62. The weight of particulate matter on the scale is accurately recorded and the set-up switch 81 is set to the normal position. The start button 76 is depressed, which clears out the LED display to restart the counter for the stepper motor 62. When the accumulated number in the LED display counts up and matches the number which was set in the thumb wheel switches 72, the comparator stops the counter and stepper motor, thus duplicating the amount of material metered in the set-up operation. Once the desired preset number is determined during the set-up run and is entered in the thumb wheel switches 72, very accurate and repeatable quantities of particulate matter can be metered and dispatched from the dispensing apparatus 10. The resume button 77 allows the cycle to be resumed if the stop button is pushed in the middle of a cycle and does not clear the counter to zero.

While there has been shown and described one preferred embodiment of a dispensing apparatus according to the invention, it will be apparent that certain deviations and variations can be had from the embodiments shown without departing from the scope and spirit of the invention.

The embodiments of the invention in which an exclusive property or privilege is claimed are defined as follows:

1. An apparatus for dispensing particulate material comprising: a housing having side walls defining a hopper with a hopper outlet opening; a conveyor belt assembly having a powered conveyor belt with a forward run located beneath the hopper outlet for receipt of particulate material from the hopper and delivery to a discharge location; electric motor means to regulate the speed of the forward run of the conveyor belt; metering means for carrying particulate material from the hopper outlet to the conveyor belt forward run, said metering means having a first end in communication with said hopper outlet and a second end poised over the conveyor belt forward run for deposit of particulate material onto the conveyor belt forward run; and control means to operate the electric motor means, said control means having display means to monitor electric impulses transferred to the electric motor means to drive the motor means which drives the conveyor belt, counter means for counting said electric impulses, comparator means connected to the counter means whereby, when a predetermined number of electrical impulses set in the counter means is monitored by the display means, the electric motor means is stopped.

2. The apparatus of claim 1 wherein: the metering means includes a metering tube, a fixed orifice transfer tube located in the hopper outlet opening and extending outward of the hopper toward the forward run of the conveyor belt; said metering tube having a first end assembled in telescopic engagement with the transfer tube and movable with respect to the transfer tube, and means to move the metering tube with respect to the transfer tube, and means to move the metering tube with respect to the transfer tube to adjust the spacing between the second end of the metering tube and the forward run of the conveyor belt.

3. The apparatus of claim 2 wherein: said means to move the metering tube with respect to the transfer tube includes a linear rack assembled to the metering tube having a plurality of rack teeth; a pinion gear having a plurality of teeth in meshing engagement with the rack teeth, a control knob mounted on the housing and connected to the pinion gear for rotation of the pinion gear to move the rack and metering tube relative to the transfer tube.

4. The apparatus of claim 3 including: an upwardly open discharge tube mounted proximate the forward end of the forward run of the conveyor belt and positioned for receipt of particulate material passing from the conveyor belt for discharge to a discharge location.

5. An apparatus for dispensing particulate material comprising:
a housing having side walls defining a hopper with a hopper outlet opening;
a conveyor belt assembly having a powered conveyor belt with a forward run located beneath the hopper outlet for receipt of particulate material from the hopper and delivery to a discharge location;
means to regulate the speed of the forward run of the conveyor belt;
a fixed orifice transfer tube located in the hopper outlet opening and extending outward of the hopper toward the forward run of the conveyor belt;
a metering tube for carrying particulate material from the hopper outlet to the conveyor belt forward run, said metering tube having a first end assembled in telescopic engagement with the transfer tube and movable with respect to the transfer tube and a second end poised over the conveyor belt forward run for deposit of particulate material onto the conveyor belt forward run;
means to move the metering tube with respect to the transfer tube to adjust the spacing between the second end of the metering tube and the forward run of the conveyor belt including a linear rack assembled to the metering tube having a plurality of rack teeth;
a pinion gear having a plurality of teeth in meshing engagement with the rack teeth, a control knob mounted on the housing and connected to the pinion gear for rotation of the pinion gear to move the rack and metering tube relative to the transfer tube;
an upwardly open discharge tube mounted proximate the forward end of the forward run of the conveyor belt and positioned for receipt of particulate material passing from the conveyor belt for discharge to a discharge location;
a recovery tray located beneath the conveyor belt and inclined downward toward the discharge tube, and a side opening in the discharge tube proximate the lower end of the recovery tray whereby particulate material spilled from the conveyor belt is caught by the recovery tray and moved to the discharge tube.

6. The apparatus of claim 5 including: a variable speed electric motor connected to the conveyor belt to drive the conveyor belt.

7. An apparatus for dispensing particulate material comprising:
a housing having side walls defining a hopper with a hopper outlet opening;
a conveyor belt assembly having a powered conveyor belt with a forward run located beneath the hopper outlet for receipt of particulate material from the hopper and delivery to a discharge location;

means to regulate the speed of the forward run of the conveyor belt;

a metering tube for carrying particulate material from the hopper outlet to the conveyor belt forward run, said metering tube having a first end in communication with said hopper outlet and a second end poised over the conveyor belt forward run for deposit of particulate material onto the conveyor belt forward run;

means to vary the spacing between the second end of the metering tube and the conveyor belt forward run;

a variable speed electric motor connected to the conveyor belt to drive the conveyor belt;

a control unit to operate the electric motor, said control unit having a light emitting diode display to monitor electric impulses transferred to the electric motor to drive the electric motor to drive the conveyor belt, a programmable digital counter connected to a programmable comparator whereby when a predetermined number of electrical impulses set in the programmable digital counter is monitored by the light emitting diode display the electric motor is stopped.

8. The apparatus of claim 7 including: a fixed orifice transfer tube located in the hopper outlet opening and extending outward of the hopper toward the forward run of the conveyor belt; said first end of the metering tube being assembled in telescopic engagement with the transfer tube and movable with respect to the transfer tube, and means to move the metering tube with respect to the transfer tube to adjust the spacing between the second end of the metering tube and the forward run of the conveyor belt.

9. The apparatus of claim 8 wherein: said means to move the metering tube with respect to the transfer tube includes; a linear rack assembled to the metering tube having a plurality of rack teeth; a pinion gear having a plurality of teeth in meshing engagement with the rack teeth, a control knob mounted on the housing and connected to the pinion gear for rotation of the pinion gear to move the rack and metering tube relative to the transfer tube.

10. An apparatus for dispensing particulate material comprising: hopper means having a hopper outlet; conveyor means including a powered conveyor belt located beneath the hopper outlet; tubular means connected to the hopper outlet for directed discharge of particulate material from the hopper means to the conveyor belt, means for movement of the tubular means and for fixing the position of the tubular means with respect to the conveyor belt surface for a first means of regulation of discharge of particulate material from the hopper means; an electric motor for controlling the speed of the conveyor belt for a second means of regulation of the discharge of particulate material from the hopper means; and a control unit to operate the electric motor, said control unit having a light emitting diode display to monitor electrical impulses transferred to the electric motor to drive the electric motor to drive the conveyor belt, a programmable digital counter connected to a programmable comparator whereby, when a predetermined number of electrical impulses set in the programmable digital counter is monitored by the light emitting diode display, the electric motor is stopped.

11. The apparatus of claim 10 wherein: said tubular means includes a first tube fixed to the hopper outlet and a second tube in telescopic engagement with the first tube.

12. The apparatus of claim 11 wherein: means for movement of the second tube with respect to the first tube comprises a linear rack fixed to the second tube and having a plurality of rack teeth, and a pinion gear having a plurality of gear teeth in meshing engagement with the rack teeth, and means for rotation of the pinion gear to move the rack and second tube up and down.

13. The apparatus of claim 11 including: an upwardly open discharge tube mounted near an end of the powered conveyor belt and positioned for receipt of particulate material passing from the conveyor belt for discharge to a discharge location.

14. An apparatus for dispensing particulate material comprising:

hopper means having a hopper outlet;

conveyor means including a powered conveyor belt located beneath the hopper outlet;

tubular means including a first tube fixed to the hopper outlet and a second tube in telescopic engagement with the first tube for directed discharge of particulate material from the hopper means to the conveyor belt, said second tube being telescopically movable with respect to the first tube so to be movable with respect to the conveyor belt surface for a first means of regulation of discharge of particulate material from the hopper means;

means for controlling the speed of the conveyor belt for a second means of regulation of the discharge of particulate material from the hopper means;

an upwardly open discharge tube mounted near an end of the powered conveyor belt and positioned for receipt of particulate material passing from the conveyor belt for discharge to a discharge location;

a recovery tray located beneath the conveyor belt and inclined downward toward the discharge tube, a side opening in the discharge tube proximate the lower end of the recovery tray whereby particulate matter spilled from the conveyor belt is caught by the recovery tray and moved to the discharge tube.

15. The apparatus of claim 14 including: means for moving the second tube with respect to the first tube comprising a linear rack fixed to the second tube, and a pinion gear located in meshing engagement with the rack, and means for rotating the pinion gear to selectively move the rack and second tube toward and away from said conveyor belt.

16. The apparatus of claim 14 including: a variable speed motor operably connected to the conveyor belt to drive the conveyor belt at a selected speed.

17. The apparatus of claim 14 including: electric motor means to drive the conveyor belt, and control means to operate the electric motor means, said control means having display means to monitor electric impulses transferred to the electric motor means to drive the motor means which drives the conveyor belt, counter means for counting said electric impulses, comparator means connected to the counter means whereby, when a predetermined number of electrical impulses set in the counter means is monitored by the display means, the electric motor means is stopped.

18. The apparatus of claim 1 or 17 wherein: the counter means is a programmable digital counter and the comparator means is a programmable comparator connected to the counter.

* * * * *

UNITED STATES PATENT AND TRADEMARK OFFICE
CERTIFICATE OF CORRECTION

PATENT NO. : 4,407,433

DATED : October 4, 1983

INVENTOR(S) : James D. Schroeder

It is certified that error appears in the above-identified patent and that said Letters Patent is hereby corrected as shown below:

Column 3, line 49, after "are" delete "is".

Column 3, line 51, "axi" should be -- axle --.

Signed and Sealed this

Sixth Day of December 1983

[SEAL]

Attest:

GERALD J. MOSSINGHOFF

Attesting Officer      Commissioner of Patents and Trademarks